US008867552B2

(12) United States Patent
Vobbilisetty et al.

(10) Patent No.: US 8,867,552 B2
(45) Date of Patent: *Oct. 21, 2014

(54) VIRTUAL CLUSTER SWITCHING

(75) Inventors: Suresh Vobbilisetty, San Jose, CA (US); Dilip Chatwani, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/087,239

(22) Filed: Apr. 14, 2011

(65) Prior Publication Data

US 2011/0268125 A1 Nov. 3, 2011

Related U.S. Application Data

(60) Provisional application No. 61/330,678, filed on May 3, 2010, provisional application No. 61/334,945, filed on May 14, 2010, provisional application No. 61/380,819, filed on Sep. 8, 2010.

(51) Int. Cl.
*H04L 1/00* (2006.01)
*H04J 1/16* (2006.01)
*G08C 15/00* (2006.01)
*G06F 11/00* (2006.01)
*G01R 31/08* (2006.01)

(52) U.S. Cl.
USPC ....... 370/395.53; 370/219; 370/401; 709/229

(58) Field of Classification Search
USPC .............. 370/229–235, 248–252, 351–397, 370/401–414; 709/220–224
See application file for complete search history.

(56) References Cited

U.S. PATENT DOCUMENTS

| 5,390,173 | A | 2/1995 | Spinney |
| 5,983,278 | A | 11/1999 | Chong |
| 6,041,042 | A | 3/2000 | Bussiere |
| 6,085,238 | A | 7/2000 | Yuasa |
| 6,104,696 | A | 8/2000 | Kadambi |
| 6,185,241 | B1 | 2/2001 | Sun |
| 6,438,106 | B1 | 8/2002 | Pillar |

(Continued)

FOREIGN PATENT DOCUMENTS

| CN | 102801599 A | 11/2012 |
| EP | 1916807 A2 | 4/2008 |
| EP | 2001167 A1 | 12/2008 |
| WO | 2010111142 A1 | 9/2010 |

OTHER PUBLICATIONS

Perlman, Radia "Challenges and Opportunities in the Design of TRILL: a Routed layer 2 Technology" 2009 IEEE Globecom Workshops.

(Continued)

*Primary Examiner* — Man Phan
(74) *Attorney, Agent, or Firm* — Shun Yao; Park, Vaughan, Fleming & Dowler LLP

(57) ABSTRACT

One embodiment of the present invention provides a switch system. The switch includes one or more ports on the switch configured to transmit packets encapsulated based on a first protocol. The switch further includes a control mechanism. During operation, the control mechanism forms a logical switch based on a second protocol, receives an automatically assigned identifier for the logical switch without requiring manual configuration of the identifier, and joins a virtual cluster switch.

29 Claims, 11 Drawing Sheets

(56) References Cited

U.S. PATENT DOCUMENTS

| | | | |
|---|---|---|---|
| 6,542,266 B1 | 4/2003 | Phillips | |
| 6,633,761 B1 | 10/2003 | Singhal | |
| 6,873,602 B1 | 3/2005 | Ambe | |
| 6,975,864 B2 | 12/2005 | Singhal | |
| 7,016,352 B1 | 3/2006 | Chow | |
| 7,173,934 B2 | 2/2007 | Lapuh | |
| 7,197,308 B2 | 3/2007 | Singhal | |
| 7,206,288 B2 | 4/2007 | Cometto | |
| 7,310,664 B1 | 12/2007 | Merchant | |
| 7,313,637 B2 | 12/2007 | Tanaka | |
| 7,330,897 B2 | 2/2008 | Baldwin | |
| 7,380,025 B1 | 5/2008 | Riggins | |
| 7,477,894 B1 | 1/2009 | Sinha | |
| 7,508,757 B2 | 3/2009 | Ge | |
| 7,558,195 B1 * | 7/2009 | Kuo et al. | 370/219 |
| 7,558,273 B1 * | 7/2009 | Grosser et al. | 370/395.53 |
| 7,571,447 B2 | 8/2009 | Ally | |
| 7,599,901 B2 | 10/2009 | Mital | |
| 7,688,960 B1 | 3/2010 | Aubuchon | |
| 7,690,040 B2 | 3/2010 | Frattura | |
| 7,716,370 B1 | 5/2010 | Devarapalli | |
| 7,787,480 B1 * | 8/2010 | Mehta et al. | 370/401 |
| 7,792,920 B2 | 9/2010 | Istvan | |
| 7,796,593 B1 | 9/2010 | Ghosh | |
| 7,808,992 B2 * | 10/2010 | Homchaudhuri et al. | 370/392 |
| 7,836,332 B2 | 11/2010 | Hara | |
| 7,843,907 B1 | 11/2010 | Abou-Emara | |
| 7,860,097 B1 | 12/2010 | Lovett | |
| 7,898,959 B1 | 3/2011 | Arad | |
| 7,924,837 B1 | 4/2011 | Shabtay | |
| 7,937,756 B2 | 5/2011 | Kay | |
| 7,949,638 B1 | 5/2011 | Goodson | |
| 7,957,386 B1 | 6/2011 | Aggarwal | |
| 8,027,354 B1 | 9/2011 | Portolani | |
| 8,054,832 B1 | 11/2011 | Shukla | |
| 8,078,704 B2 | 12/2011 | Lee | |
| 8,102,781 B2 | 1/2012 | Smith | |
| 8,116,307 B1 | 2/2012 | Thesayi | |
| 8,125,928 B2 | 2/2012 | Mehta | |
| 8,134,922 B2 | 3/2012 | Elangovan | |
| 8,155,150 B1 | 4/2012 | Chung | |
| 8,160,063 B2 | 4/2012 | Maltz | |
| 8,160,080 B1 | 4/2012 | Arad | |
| 8,170,038 B2 * | 5/2012 | Belanger et al. | 370/401 |
| 8,194,674 B1 | 6/2012 | Pagel | |
| 8,195,774 B2 | 6/2012 | Lambeth | |
| 8,213,313 B1 | 7/2012 | Doiron | |
| 8,213,336 B2 | 7/2012 | Smith | |
| 8,230,069 B2 | 7/2012 | Korupolu | |
| 8,239,960 B2 | 8/2012 | Frattura | |
| 8,249,069 B2 | 8/2012 | Raman | |
| 8,270,401 B1 | 9/2012 | Barnes | |
| 8,295,291 B1 * | 10/2012 | Ramanathan et al. | 370/400 |
| 8,301,686 B1 | 10/2012 | Appajodu | |
| 8,351,352 B1 | 1/2013 | Eastlake, III | |
| 8,369,347 B2 | 2/2013 | Xiong | |
| 8,462,774 B2 | 6/2013 | Page | |
| 8,520,595 B2 | 8/2013 | Yadav | |
| 2002/0021701 A1 | 2/2002 | Lavian | |
| 2002/0091795 A1 | 7/2002 | Yip | |
| 2003/0041085 A1 | 2/2003 | Sato | |
| 2003/0123393 A1 | 7/2003 | Feuerstraeter | |
| 2003/0189905 A1 | 10/2003 | Lee | |
| 2004/0001433 A1 | 1/2004 | Gram | |
| 2004/0117508 A1 | 6/2004 | Shimizu | |
| 2004/0120326 A1 | 6/2004 | Yoon | |
| 2004/0165595 A1 | 8/2004 | Holmgren | |
| 2004/0213232 A1 | 10/2004 | Regan | |
| 2005/0007951 A1 | 1/2005 | Lapuh | |
| 2005/0044199 A1 | 2/2005 | Shiga | |
| 2005/0094568 A1 | 5/2005 | Judd | |
| 2005/0094630 A1 | 5/2005 | Valdevit | |
| 2005/0169188 A1 | 8/2005 | Cometto | |
| 2005/0265356 A1 | 12/2005 | Kawarai | |
| 2005/0278565 A1 | 12/2005 | Frattura | |
| 2006/0018302 A1 | 1/2006 | Ivaldi | |
| 2006/0059163 A1 | 3/2006 | Frattura | |
| 2006/0062187 A1 | 3/2006 | Rune | |
| 2006/0072550 A1 | 4/2006 | Davis | |
| 2006/0083254 A1 | 4/2006 | Ge | |
| 2006/0184937 A1 | 8/2006 | Abels | |
| 2006/0242311 A1 | 10/2006 | Mai | |
| 2006/0251067 A1 | 11/2006 | DeSanti | |
| 2006/0256767 A1 | 11/2006 | Suzuki | |
| 2006/0265515 A1 | 11/2006 | Shiga | |
| 2007/0036178 A1 | 2/2007 | Hares | |
| 2007/0097968 A1 | 5/2007 | Du | |
| 2007/0116224 A1 | 5/2007 | Burke | |
| 2007/0116422 A1 | 5/2007 | Reynolds | |
| 2007/0274234 A1 | 11/2007 | Kubota | |
| 2008/0052487 A1 | 2/2008 | Akahane | |
| 2008/0065760 A1 | 3/2008 | Damm | |
| 2008/0101386 A1 | 5/2008 | Gray | |
| 2008/0133760 A1 | 6/2008 | Berkvens et al. | |
| 2008/0159277 A1 * | 7/2008 | Vobbilisetty et al. | 370/357 |
| 2008/0172492 A1 | 7/2008 | Raghunath | |
| 2008/0181196 A1 | 7/2008 | Regan | |
| 2008/0205377 A1 | 8/2008 | Chao | |
| 2008/0219172 A1 | 9/2008 | Mohan | |
| 2008/0267179 A1 | 10/2008 | Lavigne | |
| 2008/0285555 A1 | 11/2008 | Ogasahara | |
| 2009/0037607 A1 | 2/2009 | Farinacci | |
| 2009/0044270 A1 | 2/2009 | Shelly | |
| 2009/0067422 A1 | 3/2009 | Poppe | |
| 2009/0080345 A1 | 3/2009 | Gray | |
| 2009/0083445 A1 | 3/2009 | Ganga | |
| 2009/0092042 A1 | 4/2009 | Yuhara | |
| 2009/0106405 A1 | 4/2009 | Mazarick | |
| 2009/0199177 A1 | 8/2009 | Edwards | |
| 2009/0204965 A1 | 8/2009 | Tanaka | |
| 2009/0222879 A1 | 9/2009 | Kostal | |
| 2009/0245137 A1 | 10/2009 | Hares | |
| 2009/0245242 A1 | 10/2009 | Carlson | |
| 2009/0260083 A1 | 10/2009 | Szeto | |
| 2009/0323708 A1 | 12/2009 | Ihle | |
| 2009/0327392 A1 | 12/2009 | Tripathi | |
| 2009/0327462 A1 | 12/2009 | Adams | |
| 2010/0054260 A1 | 3/2010 | Pandey | |
| 2010/0061269 A1 | 3/2010 | Banerjee | |
| 2010/0074175 A1 | 3/2010 | Banks | |
| 2010/0103813 A1 | 4/2010 | Allan | |
| 2010/0103939 A1 | 4/2010 | Carlson | |
| 2010/0131636 A1 | 5/2010 | Suri | |
| 2010/0165877 A1 | 7/2010 | Shukla | |
| 2010/0165995 A1 * | 7/2010 | Mehta et al. | 370/400 |
| 2010/0169467 A1 | 7/2010 | Shukla | |
| 2010/0169948 A1 | 7/2010 | Budko | |
| 2010/0226381 A1 | 9/2010 | Mehta | |
| 2010/0246388 A1 * | 9/2010 | Gupta et al. | 370/225 |
| 2010/0257263 A1 | 10/2010 | Casado | |
| 2010/0271960 A1 | 10/2010 | Krygowski | |
| 2010/0281106 A1 | 11/2010 | Ashwood-Smith | |
| 2010/0284418 A1 | 11/2010 | Gray | |
| 2010/0287548 A1 | 11/2010 | Zhou | |
| 2010/0290473 A1 | 11/2010 | Enduri | |
| 2010/0303071 A1 | 12/2010 | Kotalwar | |
| 2010/0303075 A1 | 12/2010 | Tripathi | |
| 2010/0303083 A1 | 12/2010 | Belanger | |
| 2010/0309820 A1 | 12/2010 | Rajagopalan | |
| 2011/0019678 A1 | 1/2011 | Mehta | |
| 2011/0035498 A1 | 2/2011 | Shah | |
| 2011/0044339 A1 | 2/2011 | Kotalwar | |
| 2011/0064086 A1 | 3/2011 | Xiong | |
| 2011/0085560 A1 | 4/2011 | Chawla | |
| 2011/0085563 A1 | 4/2011 | Kotha | |
| 2011/0134925 A1 | 6/2011 | Safrai | |
| 2011/0142053 A1 | 6/2011 | Van Der Merwe | |
| 2011/0142062 A1 | 6/2011 | Wang | |
| 2011/0161695 A1 | 6/2011 | Okita | |
| 2011/0194403 A1 * | 8/2011 | Sajassi et al. | 370/217 |
| 2011/0194563 A1 | 8/2011 | Shen | |
| 2011/0231574 A1 | 9/2011 | Saunderson | |
| 2011/0235523 A1 * | 9/2011 | Jha et al. | 370/242 |
| 2011/0243133 A9 | 10/2011 | Villait | |

(56) References Cited

U.S. PATENT DOCUMENTS

| | | | |
|---|---|---|---|
| 2011/0243136 A1 | 10/2011 | Raman | |
| 2011/0246669 A1 | 10/2011 | Kanada | |
| 2011/0255538 A1 | 10/2011 | Srinivasan | |
| 2011/0255540 A1* | 10/2011 | Mizrahi et al. | 370/392 |
| 2011/0261828 A1 | 10/2011 | Smith | |
| 2011/0268120 A1 | 11/2011 | Vobbilisetty | |
| 2011/0274114 A1 | 11/2011 | Dhar | |
| 2011/0286457 A1 | 11/2011 | Ee | |
| 2011/0296052 A1 | 12/2011 | Guo | |
| 2011/0299391 A1 | 12/2011 | Vobbilisetty | |
| 2011/0299532 A1* | 12/2011 | Yu et al. | 370/392 |
| 2012/0011240 A1 | 1/2012 | Hara | |
| 2012/0014387 A1 | 1/2012 | Dunbar | |
| 2012/0027017 A1 | 2/2012 | Rai | |
| 2012/0033663 A1 | 2/2012 | Guichard | |
| 2012/0033665 A1 | 2/2012 | Jacob Da Silva | |
| 2012/0099602 A1 | 4/2012 | Nagapudi | |
| 2012/0106339 A1 | 5/2012 | Mishra | |
| 2012/0131097 A1 | 5/2012 | Baykal | |
| 2012/0131289 A1 | 5/2012 | Taguchi | |
| 2012/0243539 A1 | 9/2012 | Keesara | |
| 2013/0259037 A1 | 10/2013 | Natarajan | |

OTHER PUBLICATIONS

"Switched Virtual Internetworking moved beyond bridges and routers", 8178 Data Communications 23(1994) September, No. 12, New York.
S. Night et al., "Virtual Router Redundancy Protocol", Network Working Group, XP-002135272, Apr. 1998.
Eastlake 3rd., Donald et al., "RBridges: TRILL Header Options", Draft-ietf-trill-rbridge-options-00.txt, Dec. 24, 2009.
J. Touch, et al., "Transparent Interconnection of Lots of Links (TRILL): Problem and Applicability Statement", May 2009.
Perlman, Radia et al., "RBridge VLAN Mapping", Draft-ietf-trill-rbridge-vlan-mapping-01.txt, Dec. 4, 2009.
Brocade Fabric OS (FOS) 6.2 Virtual Fabrics Feature Frequently Asked Questions.
Perlman, Radia "Challenges and Opportunities in the Design of TRILL: a Routed layer 2 Technology", XP-002649647, 2009.
Nadas, S. et al., "Virtual Router Redundancy Protocol (VRRP) Version 3 for IPv4 and IPv6", Mar. 2010.
Perlman, Radia et al., "RBridges: Base Protocol Specification", draft-ietf-trill-rbridge-protocol-16.txt, Mar. 3, 2010.
Christensen, M. et al., "Considerations for Internet Group Management Protocol (IGMP) and Multicast Listener Discovery (MLD) Snooping Switches", May 2006.
Lapuh, Roger et al., "Split Multi-link Trunking (SMLT)", Oct. 2002.
Lapuh, Roger et al., "Split Multi-link Trunking (SMLT) draft-lapuh-network-smlt-08", 2008.
U.S. Appl. No. 12/312,903 Office Action dated Jun. 13, 2013.
U.S. Appl. No. 13/365,808 Office Action dated Jul. 18, 2013.
U.S. Appl. No. 13/365,993 Office Action dated Jul. 23, 2013.
U.S. Appl. No. 13/092,873 Office Action dated Jun. 19, 2013.
U.S. Appl. No. 13/184,526 Office Action dated May 22, 2013.
U.S. Appl. No. 13/184,526 Office Action dated Jan. 28, 2013.
U.S. Appl. No. 13/050,102 Office Action dated May 16, 2013.
U.S. Appl. No. 13/050,102 Office Action dated Oct. 26, 2012.
U.S. Appl. No. 13/044,301 Office Action dated Feb. 22, 2013.
U.S. Appl. No. 13/044,301 Office Action dated Jun. 11, 2013.
U.S. Appl. No. 13/030,688 Office Action dated Apr. 25, 2013.
U.S. Appl. No. 13/030,806 Office Action dated Dec. 3, 2012.
U.S. Appl. No. 13/030,806 Office Action dated Jun. 11, 2013.
U.S. Appl. No. 13/098,360 Office Action dated May 31, 2013.
U.S. Appl. No. 13/092,864 Office Action dated Sep. 19, 2012.
U.S. Appl. No. 12/950,968 Office Action dated Jun. 7, 2012.
U.S. Appl. No. 12/950,968 Office Action dated Jan. 4, 2013.
U.S. Appl. No. 13/092,877 Office Action dated Mar. 4, 2013.
U.S. Appl. No. 12/950,974 Office Action dated Dec. 20, 2012.
U.S. Appl. No. 12/950,974 Office Action dated May 24, 2012.
U.S. Appl. No. 13/092,752 Office Action dated Feb. 5, 2013.
U.S. Appl. No. 13/092,752 Office Action dated Jul. 18, 2013.
Application No. 13/092,701 Office Action dated Jan. 28, 2013.
U.S. Appl. No. 13/092,701 Office Action dated Jul. 3, 2013.
U.S. Appl. No. 13/092,460 Office Action dated Jun. 21, 2013.
U.S. Appl. No. 13/042,259 Office Action dated Mar. 18, 2013.
U.S. Appl. No. 13/042,259 Office Action dated Jul. 31, 2013.
U.S. Appl. No. 13/092,580 Office Action dated Jun. 10, 2013.
U.S. Appl. No. 13/092,724 Office Action dated Jul. 16, 2013.
U.S. Appl. No. 13/092,724 Office Action dated Feb. 5, 2013.
U.S. Appl. No. 13/098,490 Office Action dated Dec. 21, 2012.
U.S. Appl. No. 13/098,490 Office Action dated Jul. 9, 2013.
U.S. Appl. No. 13/087,239 Office Action dated May 22, 2013.
U.S. Appl. No. 13/087,239 Office Action dated Dec. 5, 2012.
U.S. Appl. No. 12/725,249 Office Action dated Apr. 26, 2013.
U.S. Appl. No. 12/725,249 Office Action dated Sep. 12, 2012.
Office Action for U.S. Appl. No. 13/092,887, dated Jan. 6, 2014.
Brocade Unveils "The Effortless Network", http://newsroom.brocade.com/press-releases/brocade-unveils-the-effortless-network-nasdaq-brcd-0859535, 2012.
Foundry FastIron Configuration Guide, Software Release FSX 04.2.00b, Software Release FWS 04.3.00, Software Release FGS 05.0.00a, Sep. 26, 2008.
FastIron and TurboIron 24X Configuration Guide Supporting FSX 05.1.00 for FESX, FWSX, and FSX; FGS 04.3.03 for FGS, FLS and FWS; FGS 05.0.02 for FGS-STK and FLS-STK, FCX 06.0.00 for FCX; and TIX 04.1.00 for TI24X, Feb. 16, 2010.
FastIron Configuration Guide Supporting Ironware Software Release 07.0.00, Dec. 18, 2009.
"The Effortless Network: HyperEdge Technology for the Campus LAN", 2012.
Narten, T. et al. "Problem Statement: Overlays for Network Virtualization", draft-narten-nvo3-overlay-problem-statement-01, Oct. 31, 2011.
Knight, Paul et al., "Layer 2 and 3 Virtual Private Networks: Taxonomy, Technology, and Standardization Efforts", IEEE Communications Magazine, Jun. 2004.
"An Introduction to Brocade VCS Fabric Technology", Brocade white paper, http://community.brocade.com/docs/DOC-2954, Dec. 3, 2012.
Kreeger, L. et al., "Network Virtualization Overlay Control Protocol Requirements", Draft-kreeger-nvo3-overlay-cp-00, Jan. 30, 2012.
Knight, Paul et al., "Network based IP VPN Architecture using Virtual Routers", May 2003.
Louati, Wajdi et al., "Network-based virtual personal overlay networks using programmable virtual routers", IEEE Communications Magazine, Jul. 2005.
U.S. Appl. No. 13/092,877 Office Action dated Sep. 5, 2013.
U.S. Appl. No. 13/044,326 Office Action dated Oct. 2, 2013.
Office Action for U.S. Appl. No. 13/092,580, filed Apr. 22, 2011, dated Jan. 10, 2014.
Office Action for U.S. Appl. No. 13/042,259, filed Mar. 7, 2011, dated Jan. 16, 2014.
Office Action for U.S. Appl. No. 13/184,526, filed Jul. 16, 2011, dated Dec. 2, 2013.
Office Action for U.S. Appl. No. 13/092,873, filed Apr. 22, 2011, dated Nov. 29, 2013.
Office Action for U.S. Appl. No. 13/312,903, filed Dec. 6, 2011, dated Nov. 12, 2013.
Office Action for U.S. Appl. No. 13/533,843, filed Jun. 26, 2012, dated Oct. 21, 2013.
Office Action for U.S. Appl. No. 13/598,204, filed Aug. 29, 2012, dated Feb. 20, 2014.

* cited by examiner

VIRTUAL CLUSTER SWITCHING

RELATED APPLICATIONS

This application claims the benefit of U.S. Provisional Application No. 61/330,678, entitled "Virtual Cluster Switching," by inventors Suresh Vobbilisetty and Dilip Chatwani, filed 3 May 2010, U.S. Provisional Application No. 61/334,945, entitled "Virtual Cluster Switching," by inventors Suresh Vobbilisetty and Dilip Chatwani, filed 14 May 2010, and U.S. Provisional Application No. 61/380,819, entitled "Virtual Cluster Switching," by inventors Suresh Vobbilisetty and Dilip Chatwani, filed 8 Sep. 2010, the disclosures of which are incorporated by reference herein.

The present disclosure is related to U.S. patent application Ser. No. 12/725,249, entitled "REDUNDANT HOST CONNECTION IN A ROUTED NETWORK," by inventors Somesh Gupta, Anoop Ghanwani, Phanidhar Koganti, and Shunjia Yu, filed 16 Mar. 2010, the disclosure of which is incorporated by reference herein.

BACKGROUND

1. Field

The present disclosure relates to network design. More specifically, the present disclosure relates to a method for a constructing a scalable switching system that facilitates automatic configuration.

2. Related Art

The relentless growth of the Internet has brought with it an insatiable demand for bandwidth. As a result, equipment vendors race to build larger, faster, and more versatile switches to move traffic. However, the size of a switch cannot grow infinitely. It is limited by physical space, power consumption, and design complexity, to name a few factors. More importantly, because an overly large system often does not provide economy of scale due to its complexity, simply increasing the size and throughput of a switch may prove economically unviable due to the increased per-port cost.

One way to increase the throughput of a switch system is to use switch stacking. In switch stacking, multiple smaller-scale, identical switches are interconnected in a special pattern to form a larger logical switch. However, switch stacking requires careful configuration of the ports and inter-switch links. The amount of required manual configuration becomes prohibitively complex and tedious when the stack reaches a certain size, which precludes switch stacking from being a practical option in building a large-scale switching system. Furthermore, a system based on stacked switches often has topology limitations which restrict the scalability of the system due to fabric bandwidth considerations.

SUMMARY

One embodiment of the present invention provides a switch system. The switch includes one or more ports on the switch configured to transmit packets encapsulated based on a first protocol. The switch further includes a control mechanism. During operation, the control mechanism forms a logical switch based on a second protocol, receives an automatically assigned identifier for the logical switch without requiring manual configuration of the identifier, and joins a virtual cluster switch.

In a variation on this embodiment, the virtual cluster switch comprises one or more physical switches which are allowed to be coupled in an arbitrary topology. Furthermore, the virtual cluster switch appears to be one single switch.

In a further variation, the first protocol is a Transparent Interconnection of Lots of Links (TRILL) protocol, and the packets are encapsulated in TRILL headers.

In a variation on this embodiment, the logical switch formed by the control mechanism is a logical Fibre Channel (FC) switch.

In a further variation, the identifier assigned to the logical switch is an FC switch domain ID.

In a variation on this embodiment, the control mechanism is further configured to maintain a copy of configuration information for the virtual cluster switch.

In a further variation on this embodiment, the configuration information for the virtual cluster switch comprises a number of logical switch identifiers assigned to the physical switches in the virtual cluster switch.

In a variation on this embodiment, the switch includes a media access control (MAC) learning mechanism which is configured to learn a source MAC address and a corresponding VLAN identifier of an ingress packet associated with a port and communicate a learned MAC address, a corresponding VLAN identifier, and the corresponding port information to a name service.

One embodiment of the present invention provides a switching system that includes a plurality of switches configured to transport packets using a first protocol. Each switch includes a control mechanism. The plurality switches are allowed to be coupled in an arbitrary topology. Furthermore, the control mechanism automatically configures the respective switch within the switching system based on a second protocol without requiring manual configuration, and the switching system appears externally as a single switch.

In a variation on this embodiment, a respective switch in the switching system receives an automatically configured identifier associated with a logical switch formed on the respective switch.

In a further variation, the logical switch is a logical FC switch. In addition, the identifier is an FC switch domain ID.

In a further variation, the packets are transported between switches based on a TRILL protocol. The respective switch is assigned a TRILL RBridge identifier that corresponds to the FC switch domain ID.

In a variation on this embodiment, a respective switch maintains a copy of configuration information of all the switches in the switching system.

In a variation on this embodiment, the switching system includes a name service which maintains records of MAC addresses and VLAN information learned by a respective switch.

DETAILED DESCRIPTION

Figure 1A:
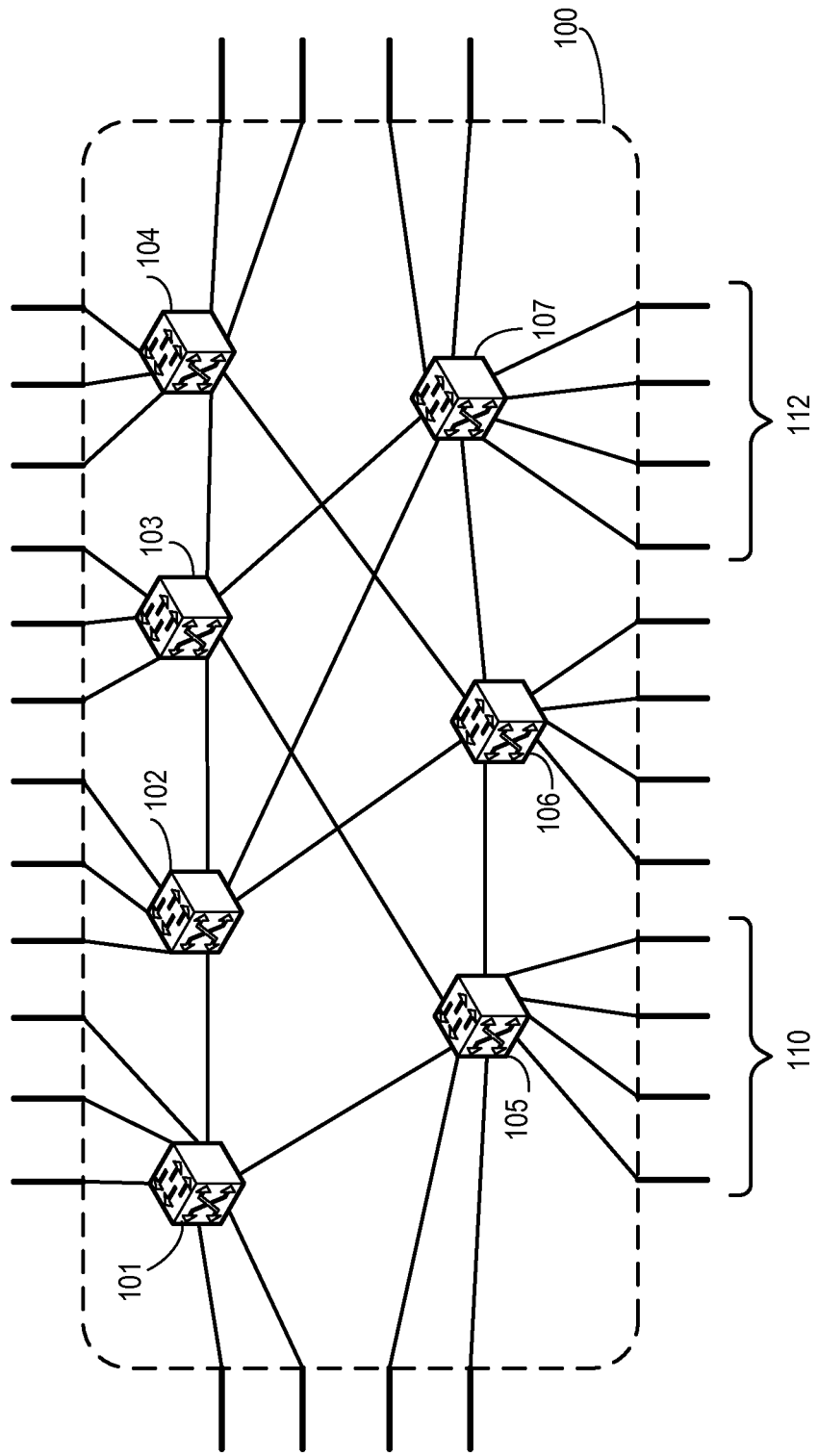
FIG. 1A illustrates an exemplary virtual cluster switch (VCS) system, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of building a versatile, cost-effective, and scalable switching system is solved by running a control plane with automatic configuration capabilities (such as the Fibre Channel control plane) over a conventional transport protocol, thereby allowing a number of switches to be inter-connected to form a single, scalable logical switch without requiring burdensome manual configuration. As a result, one can form a large-scale logical switch (referred to as a "virtual cluster switch" or VCS herein) using a number of smaller physical switches. The automatic configuration capability provided by the control plane running on each physical switch allows any number of switches to be connected in an arbitrary topology without requiring tedious manual configuration of the ports and links. This feature makes it possible to use many smaller, inexpensive switches to construct a large cluster switch, which can be viewed as a single logical switch externally.

It should be noted that a virtual cluster switch is not the same as conventional switch stacking. In switch stacking, multiple switches are interconnected at a common location (often within the same rack), based on a particular topology, and manually configured in a particular way. These stacked switches typically share a common address, e.g., IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a VCS can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm" which can be treated as a single, logical switch. Due to the automatic configuration capabilities of the VCS, an individual physical switch can dynamically join or leave the VCS without disrupting services to the rest of the network.

Furthermore, the automatic and dynamic configurability of VCS allows a network operator to build its switching system in a distributed and "pay-as-you-grow" fashion without sacrificing scalability. The VCS's ability to respond to changing network conditions makes it an ideal solution in a virtual computing environment, where network loads often change with time.

Although this disclosure is presented using examples based on the Transparent Interconnection of Lots of Links (TRILL) as the transport protocol and the Fibre Channel (FC) fabric protocol as the control-plane protocol, embodiments of the present invention are not limited to TRILL networks, or networks defined in a particular Open System Interconnection Reference Model (OSI reference model) layer. For example, a VCS can also be implemented with switches running multi-protocol label switching (MPLS) protocols for the transport. In addition, the terms "RBridge" and "switch" are used interchangeably in this disclosure. The use of the term "RBridge" does not limit embodiments of the present invention to TRILL networks only. The TRILL protocol is described in IETF draft "RBridges: Base Protocol Specification," available at http://tools.ietf.org/html/draft-ietf-trill-rbridge-protocol, which is incorporated by reference herein The terms "virtual cluster switch," "virtual cluster switching," and "VCS" refer to a group of interconnected physical switches operating as a single logical switch. The control plane for these physical switches provides the ability to automatically configure a given physical switch, so that when it joins the VCS, little or no manual configuration is required. VCS is not limited to a specific product family from a particular vendor. In addition, "VCS" is not the only term that can be used to name the switching system described herein. Other terms, such as "Ethernet fabric," "Ethernet fabric switch," "fabric switch," "cluster switch," "Ethernet mesh switch," and "mesh switch" can also be used to describe the same switching system. Hence, in some embodiments, these terms and "VCS" can be used interchangeably.

The term "RBridge" refers to routing bridges, which are bridges implementing the TRILL protocol as described in IETF draft "RBridges: Base Protocol Specification." Embodiments of the present invention are not limited to the application among RBridges. Other types of switches, routers, and forwarders can also be used.

The terms "frame" or "packet" refer to a group of bits that can be transported together across a network. "Frame" should not be interpreted as limiting embodiments of the present invention to layer-2 networks. "Packet" should not be interpreted as limiting embodiments of the present invention to layer-3 networks. "Frame" or "packet" can be replaced by other terminologies referring to a group of bits, such as "cell" or "datagram."

VCS Architecture

FIG. 1A illustrates an exemplary virtual cluster switch system, in accordance with an embodiment of the present invention. In this example, a VCS 100 includes physical switches 101, 102, 103, 104, 105, 106, and 107. A given physical switch runs an Ethernet-based transport protocol on its ports (e.g., TRILL on its inter-switch ports, and Ethernet transport on its external ports), while its control plane runs an FC switch fabric protocol stack. The TRILL protocol facilitates transport of Ethernet frames within and across VCS 100 in a routed fashion (since TRILL provides routing functions to Ethernet frames). The FC switch fabric protocol stack facilitates the automatic configuration of individual physical switches, in a way similar to how a conventional FC switch fabric is formed and automatically configured. In one embodiment, VCS 100 can appear externally as an ultra-high-capacity Ethernet switch. More details on FC network architecture, protocols, naming/address conventions, and various standards are available in the documentation available from the NCITS/ANSI T11 committee (www.t11.org) and publicly available literature, such as "Designing Storage Area Networks," by Tom Clark, 2nd Ed., Addison Wesley, 2003, the disclosures of which are incorporated by reference in their entirety herein.

A physical switch may dedicate a number of ports for external use (i.e., to be coupled to end hosts or other switches external to the VCS) and other ports for inter-switch connection. Viewed externally, VCS 100 appears to be one switch to a device from the outside, and any port from any of the physical switches is considered one port on the VCS. For example, port groups 110 and 112 are both VCS external ports and can be treated equally as if they were ports on a common physical switch, although switches 105 and 107 may reside in two different locations.

The physical switches can reside at a common location, such as a data center or central office, or be distributed in different locations. Hence, it is possible to construct a large-scale centralized switching system using many smaller, inexpensive switches housed in one or more chassis at the same location. It is also possible to have the physical switches placed at different locations, thus creating a logical switch that can be accessed from multiple locations. The topology used to interconnect the physical switches can also be versatile. VCS 100 is based on a mesh topology. In further embodiments, a VCS can be based on a ring, fat tree, or other types of topologies.

In one embodiment, the protocol architecture of a VCS is based on elements from the standard IEEE 802.1Q Ethernet bridge, which is emulated over a transport based on the Fibre Channel Framing and Signaling-2 (FC-FS-2) standard. The resulting switch is capable of transparently switching frames from an ingress Ethernet port from one of the edge switches to an egress Ethernet port on a different edge switch through the VCS.

Figure 1B:
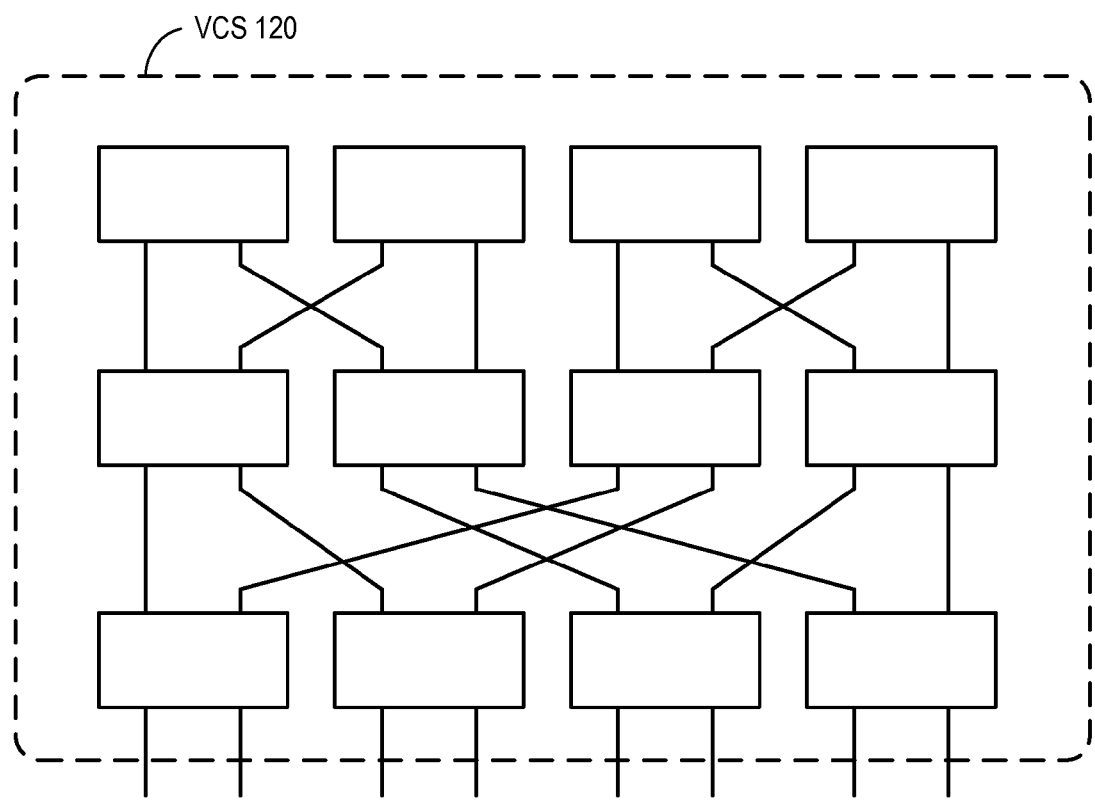
FIG. 1B illustrates an exemplary VCS system where the member switches are configured in a CLOS network, in accordance with an embodiment of the present invention.

Because of its automatic configuration capability, a VCS can be dynamically expanded as the network demand increases. In addition, one can build a large-scale switch using many smaller physical switches without the burden of manual configuration. For example, it is possible to build a high-throughput fully non-blocking switch using a number of smaller switches. This ability to use small switches to build a large non-blocking switch significantly reduces the cost associated switch complexity. FIG. 1B presents an exemplary VCS with its member switches connected in a CLOS network, in accordance with one embodiment of the present invention. In this example, a VCS 120 forms a fully non-blocking 8×8 switch, using eight 4×4 switches and four 2×2 switches connected in a three-stage CLOS network. A large-scale switch with a higher port count can be built in a similar way.

Figure 2:
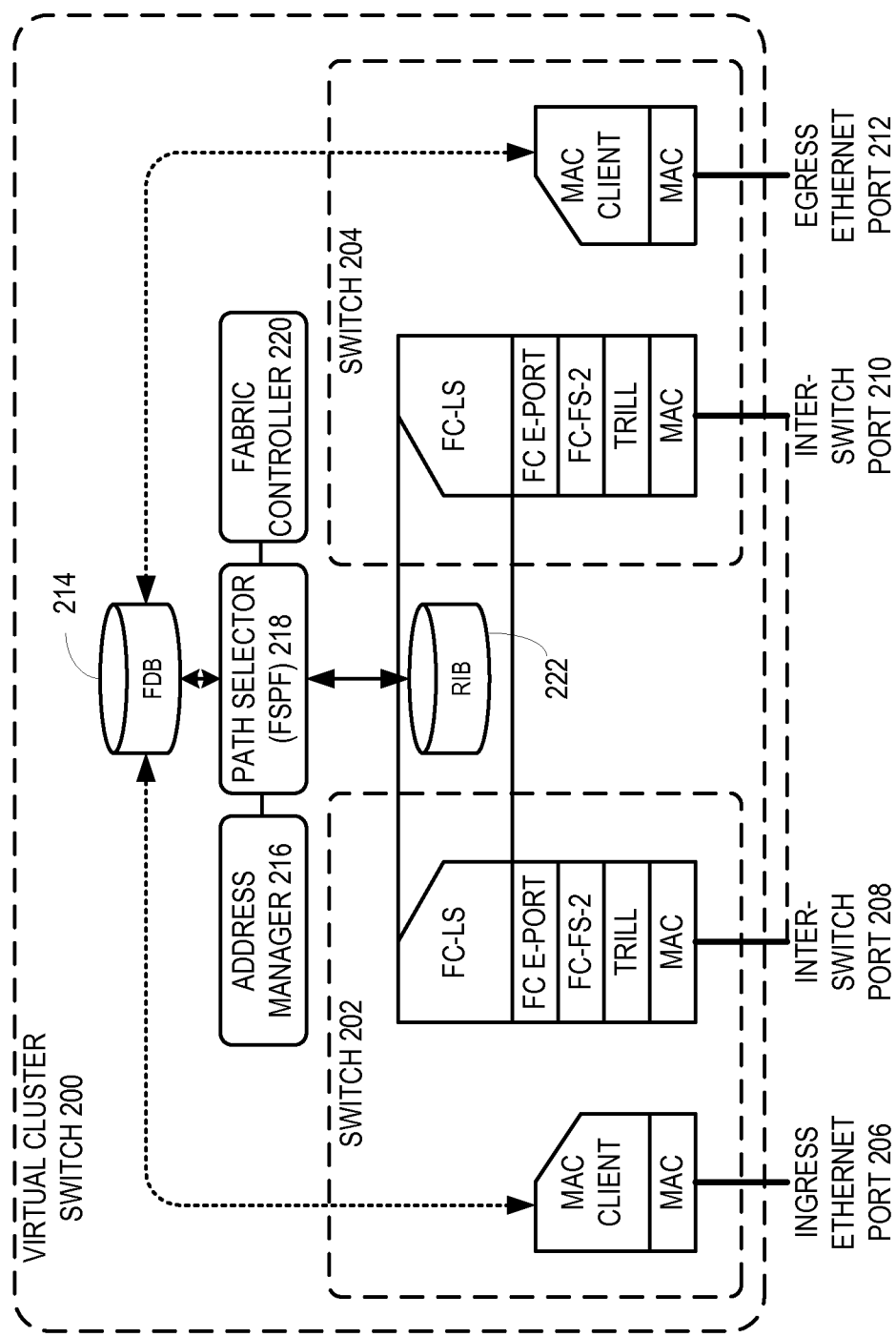
FIG. 2 illustrates the protocol stack within a virtual cluster switch, in accordance with an embodiment of the present invention.

FIG. 2 illustrates the protocol stack within a virtual cluster switch, in accordance with an embodiment of the present invention. In this example, two physical switches 202 and 204 are illustrated within a VCS 200. Switch 202 includes an ingress Ethernet port 206 and an inter-switch port 208. Switch 204 includes an egress Ethernet port 212 and an inter-switch port 210. Ingress Ethernet port 206 receives Ethernet frames from an external device. The Ethernet header is processed by a medium access control (MAC) layer protocol. On top of the MAC layer is a MAC client layer, which hands off the information extracted from the frame's Ethernet header to a forwarding database (FDB) 214. Typically, in a conventional IEEE 802.1Q Ethernet switch, FDB 214 is maintained locally in a switch, which would perform a lookup based on the destination MAC address and the VLAN indicated in the Ethernet frame. The lookup result would provide the corresponding output port. However, since VCS 200 is not one single physical switch, FDB 214 would return the egress switch's identifier (i.e., switch 204's identifier). In one embodiment, FDB 214 is a data structure replicated and distributed among all the physical switches. That is, every physical switch maintains its own copy of FDB 214. When a given physical switch learns the source MAC address and VLAN of an Ethernet frame (similar to what a conventional IEEE 802.1Q Ethernet switch does) as being reachable via the ingress port, the learned MAC and VLAN information, together with the ingress Ethernet port and switch information, is propagated to all the physical switches so every physical switch's copy of FDB 214 can remain synchronized. This prevents forwarding based on stale or incorrect information when there are changes to the connectivity of end stations or edge networks to the VCS.

The forwarding of the Ethernet frame between ingress switch 202 and egress switch 204 is performed via inter-switch ports 208 and 210. The frame transported between the two inter-switch ports is encapsulated in an outer MAC header and a TRILL header, in accordance with the TRILL standard. The protocol stack associated with a given inter-switch port includes the following (from bottom up): MAC layer, TRILL layer, FC-FS-2 layer, FC E-Port layer, and FC link services (FC-LS) layer. The FC-LS layer is responsible for maintaining the connectivity information of a physical switch's neighbor, and populating an FC routing information base (RIB) 222. This operation is similar to what is done in an FC switch fabric. The FC-LS protocol is also responsible for handling joining and departure of a physical switch in VCS 200. The operation of the FC-LS layer is specified in the FC-LS standard, which is available at http://www.t11.org/ftp/t11/member/fc/ls/06-393v5.pdf, the disclosure of which is incorporated herein in its entirety.

During operation, when FDB 214 returns the egress switch 204 corresponding to the destination MAC address of the ingress Ethernet frame, the destination egress switch's identifier is passed to a path selector 218. Path selector 218 performs a fabric shortest-path first (FSPF)-based route lookup in conjunction with RIB 222, and identifies the next-hop switch within VCS 200. In other words, the routing is performed by the FC portion of the protocol stack, similar to what is done in an FC switch fabric.

Also included in each physical switch are an address manager 216 and a fabric controller 220. Address manager 216 is responsible for configuring the address of a physical switch when the switch first joins the VCS. For example, when switch 202 first joins VCS 200, address manager 216 can negotiate a new FC switch domain ID, which is subsequently used to identify the switch within VCS 200. Fabric controller 220 is responsible for managing and configuring the logical FC switch fabric formed on the control plane of VCS 200.

One way to understand the protocol architecture of VCS is to view the VCS as an FC switch fabric with an Ethernet/TRILL transport. Each physical switch, from an external point of view, appears to be a TRILL RBridge. However, the switch's control plane implements the FC switch fabric software. In other words, embodiments of the present invention facilitate the construction of an "Ethernet switch fabric" running on FC control software. This unique combination provides the VCS with automatic configuration capability and allows it to provide the ubiquitous Ethernet services in a very scalable fashion.

Figure 3:
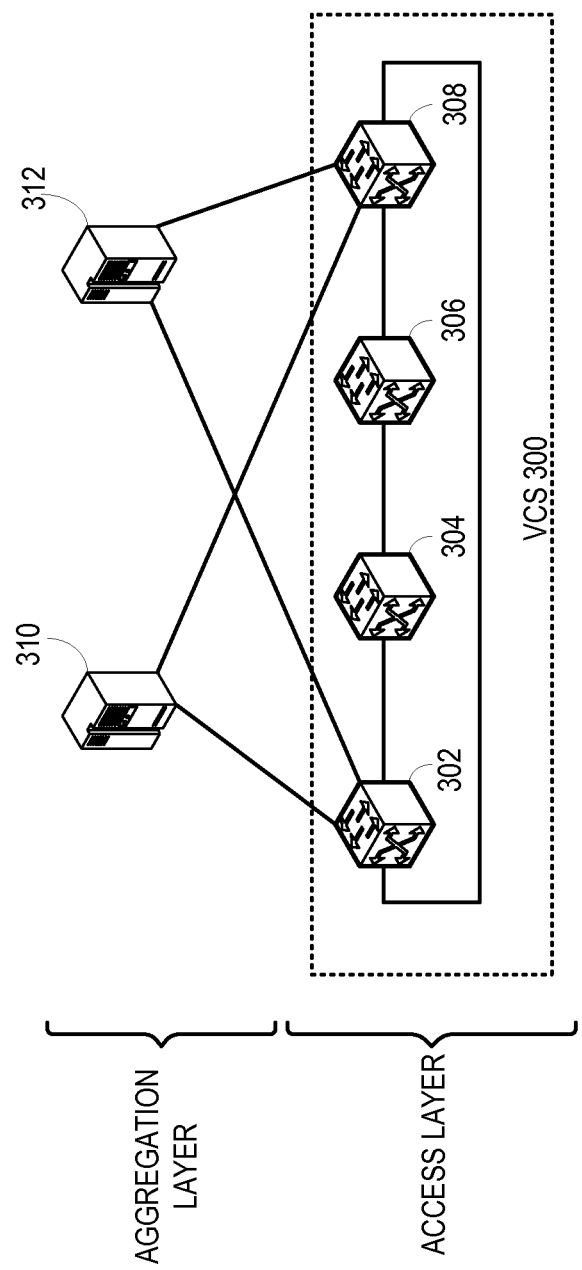
FIG. 3 illustrates an exemplary configuration of a virtual cluster switch, in accordance with an embodiment of the present invention.

FIG. 3 illustrates an exemplary configuration of a virtual cluster switch, in accordance with an embodiment of the present invention. In this example, a VCS 300 includes four physical switches 302, 304, 306, and 308. VCS 300 constitutes an access layer which is coupled to two aggregation switches 310 and 312. Note that the physical switches within VCS 300 are connected in a ring topology. Aggregation switch 310 or 312 can connect to any of the physical switches within VCS 300. For example, aggregation switch 310 is coupled to physical switches 302 and 308. These two links are viewed as a trunked link to VCS 300, since the corresponding ports on switches 302 and 308 are considered to be from the same logical switch, VCS 300. Note that, without VCS, such topology would not have been possible, because the FDB needs to remain synchronized, which is facilitated by the VCS.

Figure 4:
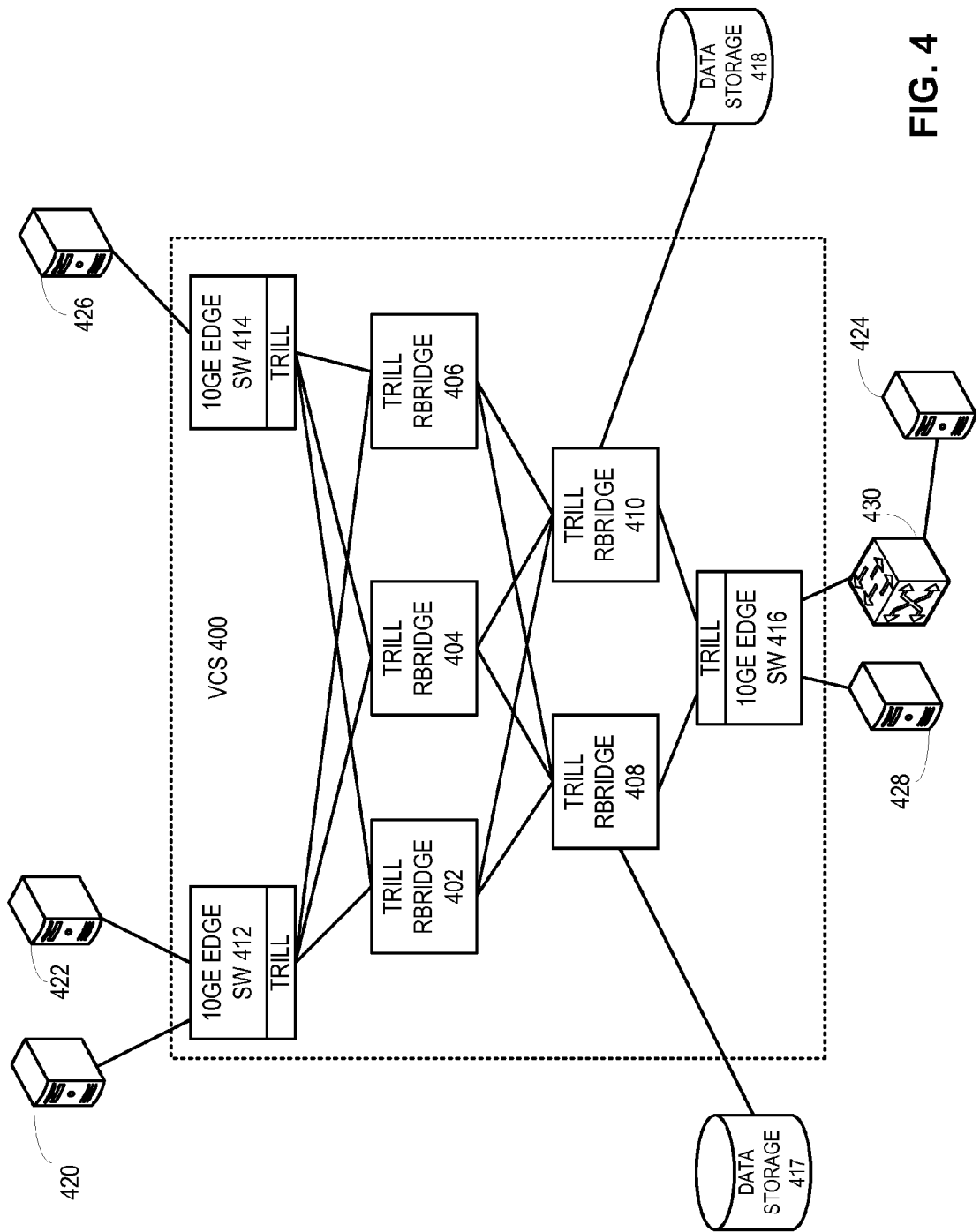
FIG. 4 illustrates an exemplary configuration of how a virtual cluster switch can be connected to different edge networks, in accordance with an embodiment of the present invention.

FIG. 4 illustrates an exemplary configuration of how a virtual cluster switch can be connected to different edge networks, in accordance with an embodiment of the present invention. In this example, a VCS 400 includes a number of TRILL RBridges 402, 404, 406, 408, and 410, which are controlled by the FC switch-fabric control plane. Also included in VCS 400 are RBridges 412, 414, and 416. Each RBridge has a number of edge ports which can be connected to external edge networks.

For example, RBridge 412 is coupled with hosts 420 and 422 via 10GE ports. RBridge 414 is coupled to a host 426 via a 10GE port. These RBridges have TRILL-based inter-switch ports for connection with other TRILL RBridges in VCS 400. Similarly, RBridge 416 is coupled to host 428 and an external Ethernet switch 430, which is coupled to an external network that includes a host 424. In addition, network equipment can also be coupled directly to any of the physical switches in VCS 400. As illustrated here, TRILL RBridge 408 is coupled to a data storage 417, and TRILL RBridge 410 is coupled to a data storage 418.

Although the physical switches within VCS 400 are labeled as "TRILL RBridges," they are different from the conventional TRILL RBridge in the sense that they are controlled by the FC switch fabric control plane. In other words, the assignment of switch addresses, link discovery and maintenance, topology convergence, routing, and forwarding can be handled by the corresponding FC protocols. Particularly, each TRILL RBridge's switch ID or nickname is mapped from the corresponding FC switch domain ID, which can be automatically assigned when a switch joins VCS 400 (which is logically similar to an FC switch fabric).

Note that TRILL is only used as a transport between the switches within VCS 400. This is because TRILL can readily accommodate native Ethernet frames. Also, the TRILL standards provide a ready-to-use forwarding mechanism that can be used in any routed network with arbitrary topology (although the actual routing in VCS is done by the FC switch fabric protocols). Embodiments of the present invention should be not limited to using only TRILL as the transport. Other protocols (such as multi-protocol label switching (MPLS) or Internet Protocol (IP)), either public or proprietary, can also be used for the transport.

VCS Formation

In one embodiment, a VCS is created by instantiating a logical FC switch in the control plane of each switch. After the logical FC switch is created, a virtual generic port (denoted as G_Port) is created for each Ethernet port on the RBridge. A G_Port assumes the normal G_Port behavior from the FC switch perspective. However, in this case, since the physical links are based on Ethernet, the specific transition from a G_Port to either an FC F_Port or E_Port is determined by the underlying link and physical layer protocols. For example, if the physical Ethernet port is connected to an external device which lacks VCS capabilities, the corresponding G_Port will be turned into an F_Port. On the other hand, if the physical Ethernet port is connected to a switch with VCS capabilities and it is confirmed that the switch on the other side is part of a VCS, then the G_Port will be turned into an E_port.

Figure 5A:
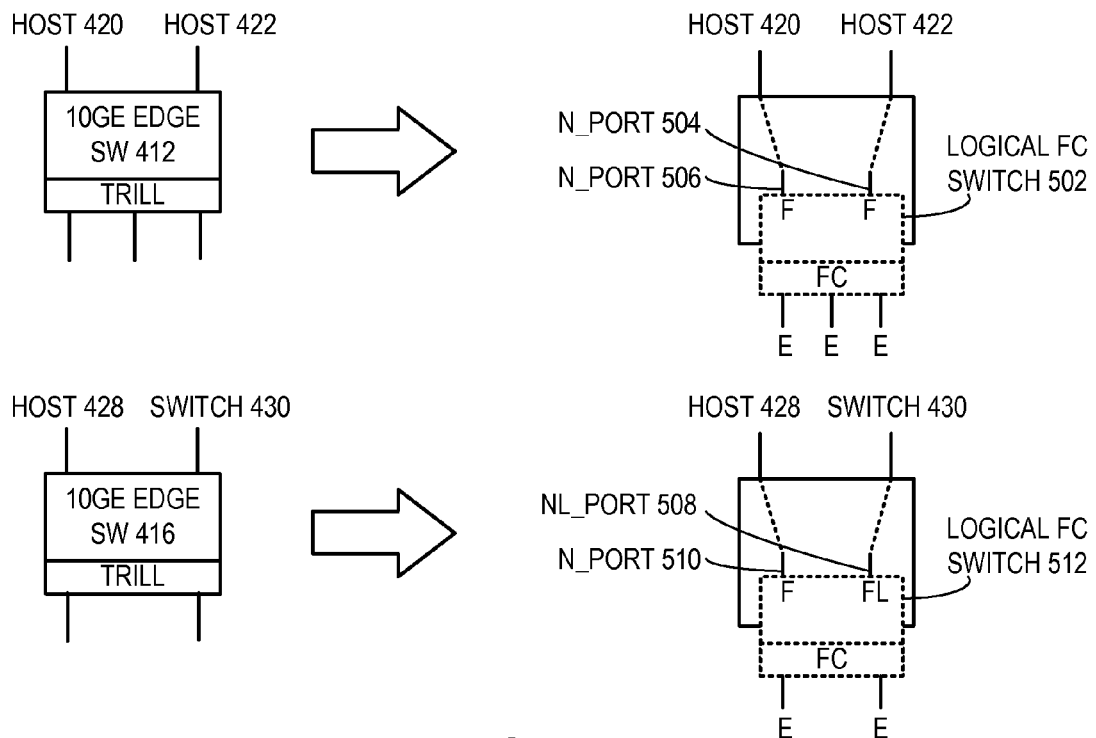
FIG. 5A illustrates how a logical Fibre Channel switch fabric is formed in a virtual cluster switch in conjunction with the example in FIG. 4, in accordance with an embodiment of the present invention.

FIG. 5A illustrates how a logical Fibre Channel switch fabric is formed in a virtual cluster switch in conjunction with the example in FIG. 4, in accordance with an embodiment of the present invention. RBridge 412 contains a virtual, logical FC switch 502. Corresponding to the physical Ethernet ports coupled to hosts 420 and 422, logical FC switch 502 has two logical F_Ports, which are logically coupled to hosts 420 and 422. In addition, two logical N_Ports, 506 and 504, are created for hosts 420 and 422, respectively. On the VCS side, logical FC switch 502 has three logical E_Ports, which are to be coupled with other logical FC switches in the logical FC switch fabric in the VCS.

Similarly, RBridge 416 contains a virtual, logical FC switch 512. Corresponding to the physical Ethernet ports coupled to host 428 and external switch 430, logical FC switch 512 has a logical F_Port coupled to host 428, and a logical FL_Port coupled to switch 430. In addition, a logical N_Port 510 is created for host 428, and a logical NL_Port 508 is created for switch 430. Note that the logical FL_Port is created because that port is coupled to a switch (switch 430), instead of a regular host, and therefore logical FC switch 512 assumes an arbitrated loop topology leading to switch 430. Logical NL_Port 508 is created based on the same reasoning to represent a corresponding NL_Port on switch 430. On the VCS side, logical FC switch 512 has two logical E_Ports, which to be coupled with other logical FC switches in the logical FC switch fabric in the VCS.

Figure 5B:
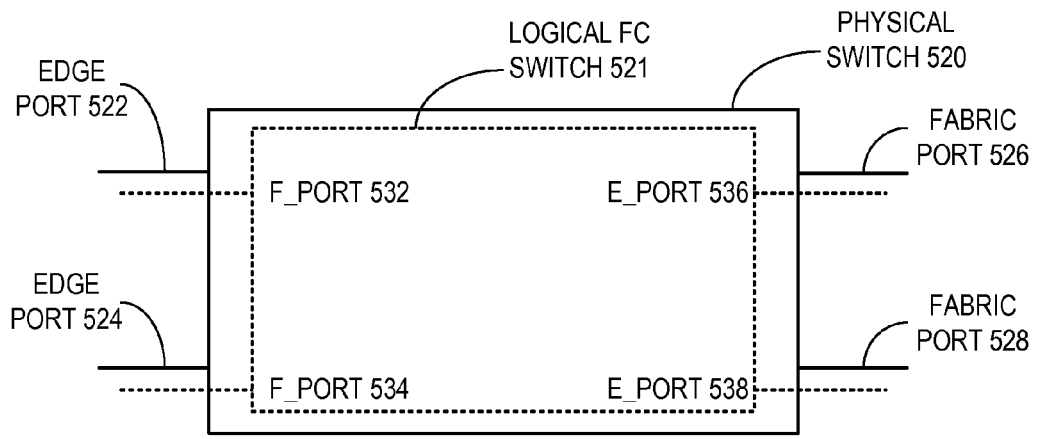
FIG. 5B illustrates an example of how a logical FC switch can be created within a physical Ethernet switch, in accordance with one embodiment of the present invention.

FIG. 5B illustrates an example of how a logical FC switch can be created within a physical Ethernet switch, in accordance with one embodiment of the present invention. The term "fabric port" refers to a port used to couple multiple switches in a VCS. The clustering protocols control the forwarding between fabric ports. The term "edge port" refers to a port that is not currently coupled to another switch unit in the VCS. Standard IEEE 802.1Q and layer-3 protocols control forwarding on edge ports.

In the example illustrated in FIG. 5B, a logical FC switch 521 is created within a physical switch (RBridge) 520. Logical FC switch 521 participates in the FC switch fabric protocol via logical inter-switch links (ISLs) to other switch units and has an FC switch domain ID assigned to it just as a physical FC switch does. In other words, the domain allocation, principal switch selection, and conflict resolution work just as they would on a physical FC ISL.

The physical edge ports 522 and 524 are mapped to logical F_Ports 532 and 534, respectively. In addition, physical fabric ports 526 and 528 are mapped to logical E_Ports 536 and 538, respectively. Initially, when logical FC switch 521 is created (for example, during the boot-up sequence), logical FC switch 521 only has four G_Ports which correspond to the four physical ports. These G_Ports are subsequently mapped to F_Ports or E_Ports, depending on the devices coupled to the physical ports.

Neighbor discovery is the first step in VCS formation between two VCS-capable switches. It is assumed that the verification of VCS capability can be carried out by a handshake process between two neighbor switches when the link is first brought up.

In general, a VCS presents itself as one unified switch composed of multiple member switches. Hence, the creation and configuration of VCS is of critical importance. The VCS configuration is based on a distributed database, which is replicated and distributed over all switches.

In one embodiment, a VCS configuration database includes a global configuration table (GT) of the VCS and a list of switch description tables (STs), each of which describes a VCS member switch. In its simplest form, a member switch can have a VCS configuration database that includes a global table and one switch description table, e.g., [<GT><ST>]. A VCS with multiple switches will have a configuration database that has a single global table and multiple switch description tables, e.g., [<GT><ST0><ST1> . . . <STn–1>]. The number n corresponds to the number of member switches in the VCS. In one embodiment, the GT can include at least the following information: the VCS ID, number of nodes in the VCS, a list of VLANs supported by the VCS, a list of all the switches (e.g., list of FC switch domain IDs for all active switches) in the VCS, and the FC switch domain ID of the principal switch (as in a logical FC switch fabric). A switch description table can include at least the following information: the IN_VCS flag, indication whether the switch is a principal switch in the logical FC switch fabric, the FC switch domain ID for the switch, the FC world-wide name (WWN) for the corresponding logical FC switch; the mapped ID of the switch, and optionally the IP address of the switch.

In addition, each switch's global configuration database is associated with a transaction ID. The transaction ID specifies the latest transaction (e.g., update or change) incurred to the global configuration database. The transaction IDs of the global configuration databases in two switches can be compared to determine which database has the most current information (i.e., the database with the more current transaction ID is more up-to-date). In one embodiment, the transaction ID is the switch's serial number plus a sequential transaction number. This configuration can unambiguously resolve which switch has the latest configuration.

Figure 6:
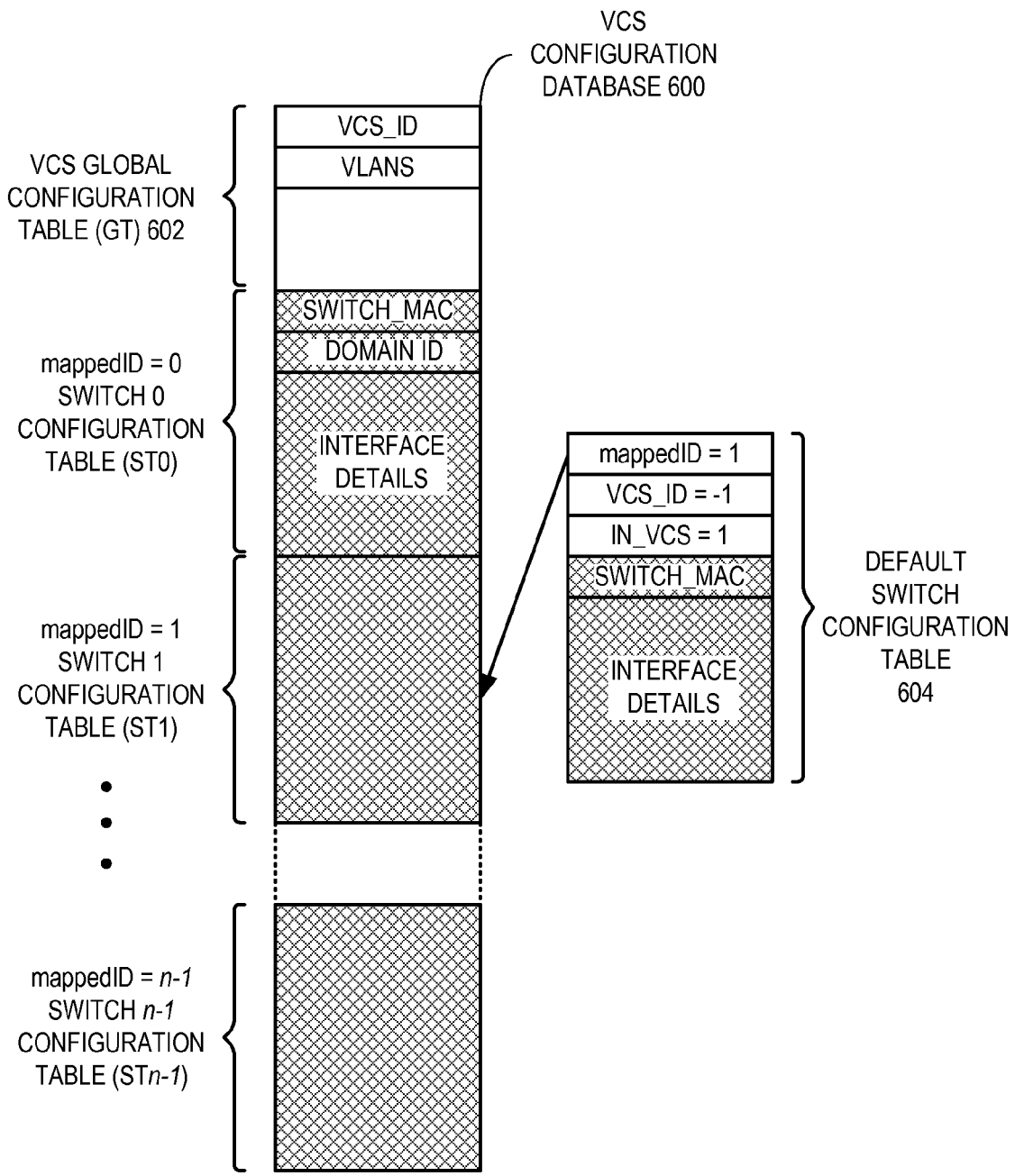
FIG. 6 illustrates an exemplary VCS configuration database, in accordance with an embodiment of the present invention.

As illustrated in FIG. 6, a VCS member switch typically maintains two configuration tables that describe its instance: a VCS configuration database 600, and a default switch configuration table 604. VCS configuration database 600 describes the VCS configuration when the switch is part of a VCS. Default switch configuration table 604 describes the switch's default configuration. VCS configuration database 600 includes a GT 602, which includes a VCS identifier (denoted as VCS_ID) and a VLAN list within the VCS. Also included in VCS configuration database 600 are a number of STs, such as ST0, ST1, and STn. Each ST includes the corresponding member switch's MAC address and FC switch domain ID, as well as the switch's interface details. Note that each switch also has a VCS-mapped ID which is a switch index within the VCS.

In one embodiment, each switch also has a VCS-mapped ID (denoted as "mappedID"), which is a switch index within the VCS. This mapped ID is unique and persistent within the VCS. That is, when a switch joins the VCS for the first time, the VCS assigns a mapped ID to the switch. This mapped ID persists with the switch, even if the switch leaves the VCS. When the switch joins the VCS again at a later time, the same mapped ID is used by the VCS to retrieve previous configuration information for the switch. This feature can reduce the amount of configuration overhead in VCS. Also, the persistent mapped ID allows the VCS to "recognize" a previously configured member switch when it re-joins the VCS, since a dynamically assigned FC fabric domain ID would change each time the member switch joins and is configured by the VCS.

Default switch configuration table 604 has an entry for the mappedID that points to the corresponding ST in VCS configuration database 600. Note that only VCS configuration database 600 is replicated and distributed to all switches in the VCS. Default switch configuration table 604 is local to a particular member switch.

The "IN_VCS" value in default switch configuration table 604 indicates whether the member switch is part of a VCS. A switch is considered to be "in a VCS" when it is assigned one of the FC switch domains by the FC switch fabric with two or more switch domains. If a switch is part of an FC switch fabric that has only one switch domain, i.e., its own switch domain, then the switch is considered to be "not in a VCS."

When a switch is first connected to a VCS, the logical FC switch fabric formation process allocates a new switch domain ID to the joining switch. In one embodiment, only the switches directly connected to the new switch participate in the VCS join operation.

Note that in the case where the global configuration database of a joining switch is current and in sync with the global configuration database of the VCS based on a comparison of the transaction IDs of the two databases (e.g., when a member switch is temporarily disconnected from the VCS and reconnected shortly afterward), a trivial merge is performed. That is, the joining switch can be connected to the VCS, and no change or update to the global VCS configuration database is required.

Figure 7:
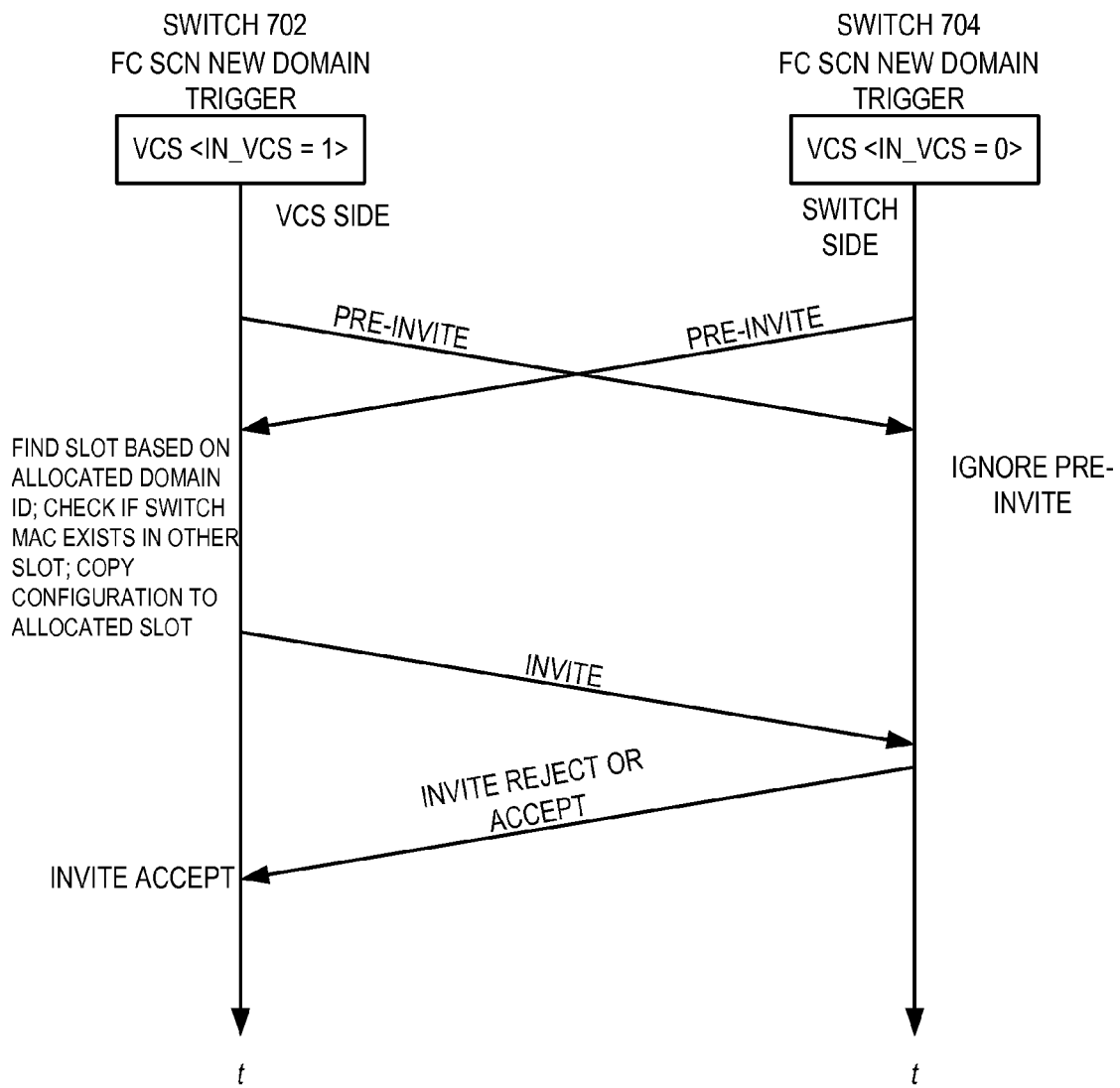
FIG. 7 illustrates an exemplary process of a switch joining a virtual cluster switch, in accordance with an embodiment of the present invention.

FIG. 7 illustrates an exemplary process of a switch joining a virtual cluster switch, in accordance with an embodiment of the present invention. In this example, it is assumed that a switch 702 is within an existing VCS, and a switch 704 is joining the VCS. During operation, both switches 702 and 704 trigger an FC State Change Notification (SCN) process. Subsequently, both switches 702 and 704 perform a PRE-INVITE operation. The pre-invite operation involves the following process.

When a switch joins the VCS via a link, both neighbors on each end of the link present to the other switch a VCS four-tuple of <Prior VCS_ID, SWITCH_MAC, mappedID, IN_VCS> from a prior incarnation, if any. Otherwise, the switch presents to the counterpart a default tuple. If the VCS_ID value was not set from a prior join operation, a VCS_ID value of –1 is used. In addition, if a switch's IN_VCS flag is set to 0, it sends out its interface configuration to the neighboring switch. In the example in FIG. 7, both switches 702 and 704 send the above information to the other switch.

After the above PRE-INVITE operation, a driver switch for the join process is selected. By default, if a switch's IN_VCS value is 1 and the other switch's IN_VCS value is 0, the switch with IN_VCS=1 is selected as the driver switch. If both switches have their IN_VCS values as 1, then nothing happens, i.e., the PRE-INVITE operation would not lead to an INVITE operation. If both switches have their IN_VCS values as 0, then one of the switches is elected to be the driving switch (for example, the switch with a lower FC switch domain ID value). The driving switch's IN_VCS value is then set to 1 and drives the join process.

After switch 702 is selected as the driver switch, switch 702 then attempts to reserve a slot in the VCS configuration database corresponding to the mappedID value in switch 704's PRE-INVITE information. Next, switch 702 searches the VCS configuration database for switch 704's MAC address in any mappedID slot. If such a slot is found, switch 702 copies all information from the identified slot into the reserved slot. Otherwise, switch 702 copies the information received during the PRE-INVITE from switch 704 into the VCS configuration database. The updated VCS configuration database is then propagated to all the switches in the VCS as a prepare operation in the database (note that the update is not committed to the database yet).

Subsequently, the prepare operation may or may not result in configuration conflicts, which may be flagged as warnings or fatal errors. Such conflicts can include inconsistencies between the joining switch's local configuration or policy setting and the VCS configuration. For example, a conflict arises when the joining switch is manually configured to allow packets with a particular VLAN value to pass through, whereas the VCS does not allow this VLAN value to enter the switch fabric from this particular RBridge (for example, when this VLAN value is reserved for other purposes). In one embodiment, the prepare operation is handled locally and/or remotely in concert with other VCS member switches. If there is an un-resolvable conflict, switch 702 sends out a PRE-INVITE-FAILED message to switch 704. Otherwise, switch 702 generates an INVITE message with the VCS's merged view of the switch (i.e., the updated VCS configuration database).

Upon receiving the INVITE message, switch 704 either accepts or rejects the INVITE. The INVITE can be rejected if the configuration in the INVITE is in conflict with what switch 704 can accept. If the INVITE is acceptable, switch 704 sends back an INVITE-ACCEPT message in response. The INVITE-ACCEPT message then triggers a final database commit throughout all member switches in the VCS. In other words, the updated VCS configuration database is updated, replicated, and distributed to all the switches in the VCS.

Layer-2 Services in VCS

In one embodiment, each VCS switch unit performs source MAC address learning, similar to what an Ethernet bridge does. Each {MAC address, VLAN} tuple learned on a physical port on a VCS switch unit is registered into the local Fibre Channel Name Server (FC-NS) via a logical Nx_Port interface corresponding to that physical port. This registration binds the address learned to the specific interface identified by the Nx_Port. Each FC-NS instance on each VCS switch unit coordinates and distributes all locally learned {MAC address, VLAN} tuples with every other FC-NS instance in the fabric. This feature allows the dissemination of locally learned {MAC addresses, VLAN} information to every switch in the VCS. In one embodiment, the learned MAC addresses are aged locally by individual switches.

Figure 8:
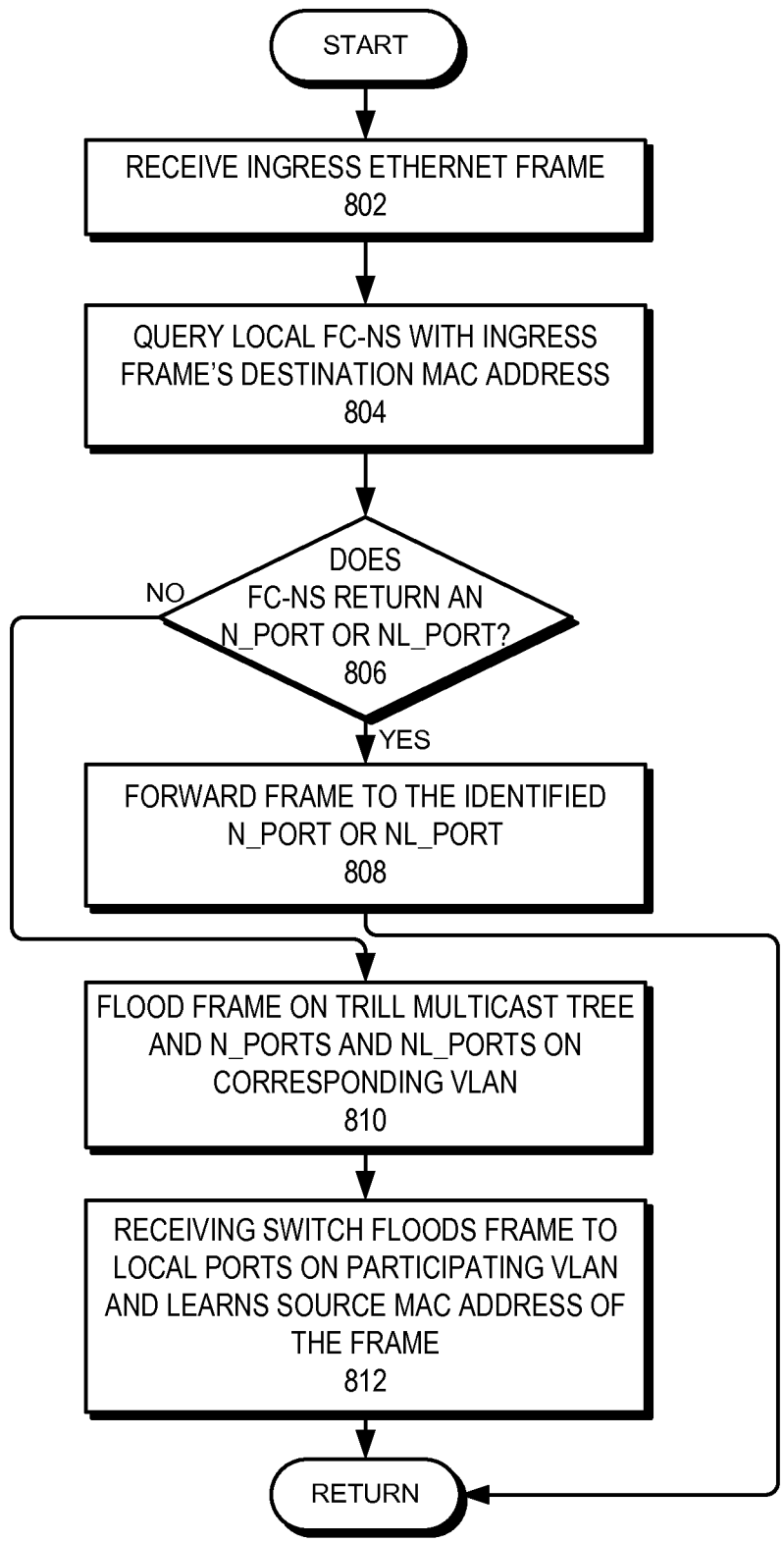
FIG. 8 presents a flowchart illustrating the process of looking up an ingress frame's destination MAC address and forwarding the frame in a VCS, in accordance with one embodiment of the present invention.

FIG. 8 presents a flowchart illustrating the process of looking up an ingress frame's destination MAC address and forwarding the frame in a VCS, in accordance with one embodiment of the present invention. During operation, a VCS switch receives an Ethernet frame at one of its Ethernet ports (operation 802). The switch then extracts the frame's destination MAC address and queries the local FC Name Server (operation 804). Next, the switch determines whether the FC-NS returns an N_Port or an NL_Port identifier that corresponds to an egress Ethernet port (operation 806).

If the FC-NS returns a valid result, the switch forwards the frame to the identified N_Port or NL_Port (operation 808). Otherwise, the switch floods the frame on the TRILL multicast tree as well as on all the N_Ports and NL_Ports that participate in that VLAN (operation 810). This flood/broadcast operation is similar to the broadcast process in a conventional TRILL RBridge, wherein all the physical switches in the VCS will receive and process this frame, and learn the source address corresponding to the ingress RBridge. In addition, each receiving switch floods the frame to its local ports that participate in the frame's VLAN (operation 812). Note that the above operations are based on the presumption that there is a one-to-one mapping between a switch's TRILL identifier (or nickname) and its FC switch domain ID. There is also a one-to-one mapping between a physical Ethernet port on a switch and the corresponding logical FC port.

End-to-End Frame Delivery and Exemplary VCS Member Switch

Figure 9:
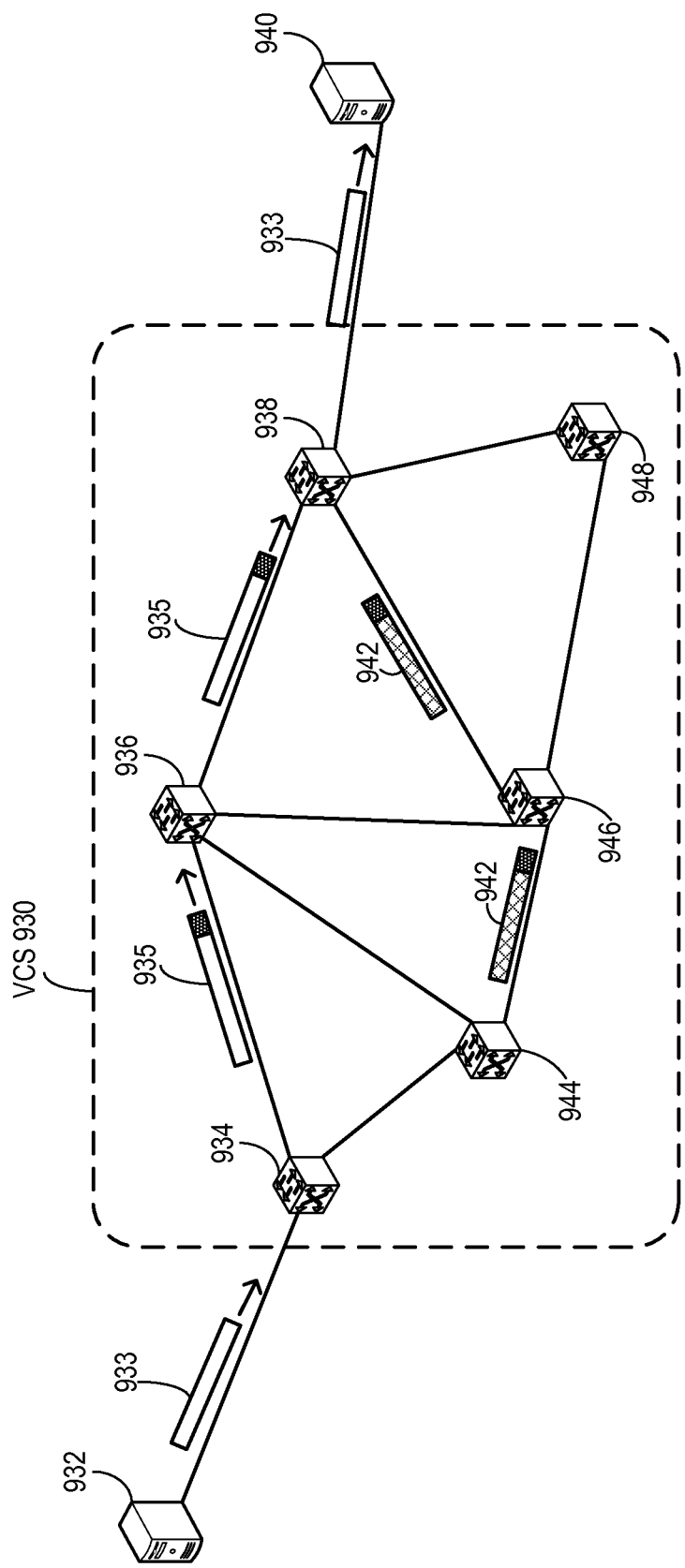
FIG. 9 illustrates how data frames and control frames are transported through a VCS, in accordance with one embodiment of the present invention.

FIG. 9 illustrates how data frames and control frames are transported in a VCS, in accordance with an embodiment of the present invention. In this example, a VCS 930 includes member switches 934, 936, 938, 944, 946, and 948. An end host 932 is communicating with an end host 940. Switch 934 is the ingress VCS member switch corresponding to host 932, and switch 938 is the egress VCS member switch corresponding to host 938. During operation, host 932 sends an Ethernet frame 933 to host 940. Ethernet frame 933 is first encountered by ingress switch 934. Upon receiving frame 933, switch 934 first extracts frame 933's destination MAC address. Switch 934 then performs a MAC address lookup using the Ethernet name service, which provides the egress switch identifier (i.e., the RBridge identifier of egress switch 938). Based on the egress switch identifier, the logical FC switch in switch 934 performs a routing table lookup to determine the next-hop switch, which is switch 936, and the corresponding output port for forwarding frame 933. The egress switch identifier is then used to generate a TRILL header (which specifies the destination switch's RBridge identifier), and the next-hop switch information is used to generate an outer Ethernet header. Subsequently, switch 934 encapsulates frame 933 with the proper TRILL header and outer Ethernet header, and sends the encapsulated frame 935 to switch 936. Based on the destination RBridge identifier in the TRILL header of frame 935, switch 936 performs a routing table lookup and determines the next hop. Based on the next-hop information, switch 936 updates frame 935's outer Ethernet header and forwards frame 935 to egress switch 938.

Upon receiving frame 935, switch 938 determines that it is the destination RBridge based on frame 935's TRILL header. Correspondingly, switch 938 strips frame 935 of its outer Ethernet header and TRILL header, and inspects the destination MAC address of its inner Ethernet header. Switch 938 then performs a MAC address lookup and determines the correct output port leading to host 940. Subsequently, the original Ethernet frame 933 is transmitted to host 940.

As described above, the logical FC switches within the physical VCS member switches may send control frames to one another (for example, to update the VCS global configuration database or to notify other switches of the learned MAC addresses). In one embodiment, such control frames can be FC control frames encapsulated in a TRILL header and an outer Ethernet header. For example, if the logical FC switch in switch 944 is in communication with the logical FC switch in switch 938, switch 944 can sends a TRILL-encapsulated FC control frame 942 to switch 946. Switch 946 can forward frame 942 just like a regular data frame, since switch 946 is not concerned with the payload in frame 942.

Figure 10:
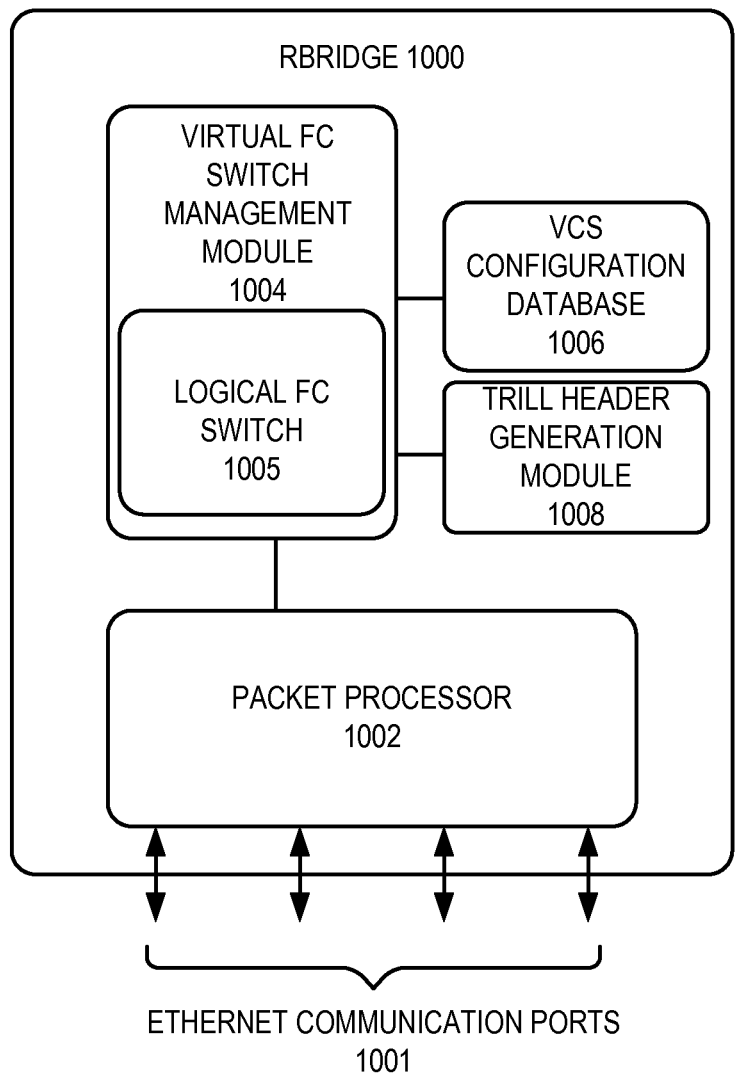
FIG. 10 illustrates an exemplary switch that facilitates formation of a virtual cluster switch, in accordance with an embodiment of the present invention.

FIG. 10 illustrates an exemplary VCS member switch, in accordance with one embodiment of the present invention. In this example, the VCS member switch is a TRILL RBridge 1000 running special VCS software. RBridge 1000 includes a number of Ethernet communication ports 1001, which can transmit and receive Ethernet frames and/or TRILL encapsulated frames. Also included in RBridge 1000 is a packet processor 1002, a virtual FC switch management module 1004, a logical FC switch 1005, a VCS configuration database 1006, and a TRILL header generation module 1008.

During operation, packet processor 1002 extracts the source and destination MAC addresses of incoming frames, and attaches proper Ethernet or TRILL headers to outgoing frames. Virtual FC switch management module 1004 maintains the state of logical FC switch 1005, which is used to join other VCS switches using the FC switch fabric protocols. VCS configuration database 1006 maintains the configuration state of every switch within the VCS. TRILL header generation module 1008 is responsible for generating property TRILL headers for frames that are to be transmitted to other VCS member switches.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   a forwarding module operable to determine an output port for a packet; and
   a control module operable to:
      receive an identifier for the switch; and
      join a virtual cluster switch;
   a media access control (MAC) learning module operable to:
      learn a source MAC address and a corresponding virtual local area network (VLAN) identifier of an ingress packet associated with a port; and
      communicate the learned MAC address, corresponding VLAN identifier, and corresponding port information to a name service.

2. The switch of claim 1,
   wherein the virtual cluster switch comprises one or more physical switches which are allowed to be coupled in an arbitrary topology; and
   wherein the virtual cluster switch operates as one single switch.

3. The switch of claim 1, wherein while determining the output port for the packet, the forwarding module is operable to make the determination based on an Ethernet protocol.

4. The switch of claim 1, wherein while determining the output port for the packet, the forwarding module is operable to make the determination based on a Transparent Interconnection of Lots of Links (TRILL) protocol, and wherein the packets is encapsulated in a TRILL header.

5. The switch of claim 1, wherein the identifier is based on a Fibre Channel (FC) switch domain ID.

6. The switch of claim 1, wherein the control module is further operable to maintain a copy of configuration information for the virtual cluster switch.

7. The switch of claim 6, wherein the configuration information for the virtual cluster switch indicates a respective switch identifier assigned to a respective physical switch in the virtual cluster switch.

8. The switch of claim 1, wherein the forwarding module is further operable to query the name service based on a received packet's destination MAC address and corresponding VLAN information.

9. A switching system, comprising:
   a plurality of switches configured to transport packets using a first protocol;
   a control module residing on a respective switch;
   wherein the control module runs a control plane based on a second protocol;
   wherein the plurality of switches are allowed to be coupled in an arbitrary topology;
   wherein the control module configures the respective switch within the switching system based on the control plane; and
   wherein the switching system operates as a single Ethernet switch; and
   a media access control (MAC) learning module residing on the respective switch and operable to:
      learn a source MAC address and a corresponding virtual local area network (VLAN) identifier of an ingress packet associated with a port; and
      communicate the learned MAC address, corresponding VLAN identifier, and corresponding port information to a name service.

10. The switching system of claim 9, wherein a respective switch in the switching system receives an identifier based on the control plane.

11. The switching system of claim 10, wherein the identifier is based on an FC switch domain ID.

12. The switching system of claim 11,
   wherein the packets are transported between switches based on a TRILL protocol; and
   wherein the respective switch is assigned a TRILL RBridge identifier that corresponds to the FC switch domain ID.

13. The switching system of claim 9, wherein a respective switch maintains a copy of configuration information of all the switches in the switching system.

14. The switching system of claim 9, further comprising the name service which maintains records of MAC addresses and VLAN information learned by a respective switch.

15. A method performed by a switch, comprising:
   encapsulating a packet based on a first protocol;
   receiving an identifier for the switch based on a second protocol;
   joining a virtual cluster switch;
   learning a source MAC address and a corresponding VLAN identifier of an ingress packet associated with a port; and
   communicating the learned MAC address, corresponding VLAN identifier, and corresponding port information to a name service.

16. The method of claim 15, wherein the identifier assigned to the Ethernet switch is based on an FC switch domain ID.

17. The method of claim 15, further comprising maintaining a copy of configuration information for the virtual cluster switch.

18. A switch means, comprising:
   a communication means for encapsulating packets based on a first protocol;
   a control means for running a control plane based on a second protocol;
   a switch means for forming an Ethernet switch based on the control panel;
   a receiving means for receiving an identifier for the Ethernet switch;
   a joining means for joining a virtual cluster switch via the control plane; and
   a MAC learning means for learning a source MAC address and a corresponding VLAN identifier of an ingress packet associated with a port and communicating the learned MAC address, corresponding VLAN identifier, and corresponding port information to a name service.

19. The switch of claim 1, wherein the identifier for Ethernet switch is a TRILL RBridge identifier.

20. The switch of claim 1, wherein the first protocol is a Multi-Protocol Label Switch (MPLS) protocol.

21. The switch of claim 1, wherein while determining the output port for the packet, the forwarding module is operable to perform a lookup using the name service, receive an egress switch identifier from the name service, and determine the output port corresponding to the egress switch identifier.

22. The switch of claim 2, wherein the physical switches in the virtual cluster switch are allowed to be coupled in a mesh topology.

23. The switching system of claim 9, wherein the packets are transported between switches based on an MPLS protocol.

24. The switching system of claim 9, wherein the switches are allowed to be coupled in a mesh topology.

25. The switching system of claim 9, wherein the name service can be queried to return an egress switch identifier based on a packet's destination MAC address, and wherein the egress switch identifier can be used to determine an output port for the packet.

26. The method of claim 15, wherein the first protocol is based on a TRILL protocol.

27. The method of claim 15, wherein the identifier is a TRILL RBridge identifier.

28. The method of claim 15, wherein the first protocol is based on an MPLS protocol.

29. The method of claim 15, further comprising querying the name service with a packet's destination MAC address, receiving a corresponding egress switch identifier from the name service, and determining an output port for the packet based on the egress switch identifier.

* * * * *

UNITED STATES PATENT AND TRADEMARK OFFICE
CERTIFICATE OF CORRECTION

PATENT NO. : 8,867,552 B2
APPLICATION NO. : 13/087239
DATED : October 21, 2014
INVENTOR(S) : Suresh Vobbilisetty et al.

It is certified that error appears in the above-identified patent and that said Letters Patent is hereby corrected as shown below:

In the Claims

In claim 4 (at column 14, line 14), please correct the word "packets" to "packet" so the line reads --packet is encapsulated in a TRILL header.--

Signed and Sealed this
Tenth Day of February, 2015

Michelle K. Lee
*Deputy Director of the United States Patent and Trademark Office*

UNITED STATES PATENT AND TRADEMARK OFFICE
CERTIFICATE OF CORRECTION

PATENT NO. : 8,867,552 B2  
APPLICATION NO. : 13/087239  
DATED : October 21, 2014  
INVENTOR(S) : Suresh Vobbilisetty et al.

Page 1 of 1

It is certified that error appears in the above-identified patent and that said Letters Patent is hereby corrected as shown below:

In the claims

In claim 19 (at column 15, line 33), replace the word "Ethernet" to "the" so the line reads --wherein the identifier for the switch is a TRILL RBridge identifier--

In claim 20 (at column 16, line 41), correct the phrase "first protocol is" to "forwarding module is further operable to determine the output port for the packet based on" so the line reads --wherein the forwarding module is further operable to determine the output port for the packet based on a Multi-Protocol Label Switch (MPLS) protocol--

Signed and Sealed this
Twelfth Day of January, 2016

Michelle K. Lee
*Director of the United States Patent and Trademark Office*